Patented Mar. 10, 1942

2,276,166

UNITED STATES PATENT OFFICE 2,276,166

PROCESS OF PREPARING CHLORINATED BROMOMETHANES

Karl Dachlauer, Hofheim in Taunus, and Hermann Petri, Frankfort-on-the-Main-Hochst, Germany, assignors, by mesne assignments, to General Aniline & Film Corporation, New York, N. Y., a corporation of Delaware No Drawing. Application July 25, 1939, Serial No. 286,408. In Germany July 28, 1938

3 Claims. (Cl. 204—163)

The present invention relates to a process of preparing chlorinated bromomethanes.

We have found that liquid methyl bromide is surprisingly easily chlorinated by the action of chlorine with the aid of actinic light as a catalyst and that in this manner, preferably while working under atmospheric pressure, monochloro-, dichloro- and trichloro-bromomethanes are obtained. Bright day-light or artificial light, for instance an ordinary metal filament lamp or a mercury lamp may serve as light source. The term "actinic light," as hereinafter referred to in the specification and claims, covers all types of light which are capable of catalyzing the reaction and excludes only those wave lengths which would be inoperative. It is possible to a great extent, by regulating the temperature of chlorination and the amount of chlorine introduced to obtain compositions containing various amounts of higher chlorinated products. For obtaining chiefly low chlorinated bromomethanes, namely monochloro-bromomethane, the chlorination is interrupted when per 1 mol of methylbromide about ½ mol of chlorine has been consumed and the unchanged portion of methyl bromide is eliminated by fractional distillation, or methyl bromide is first introduced into the chlorination vessel, chlorine and further methyl bromide are continuously added in a stoichiometric proportion and the chlorination mixture formed (methyl bromide and methyl chlorobromide) is continuously caused to flow into a fractionating device where the methyl bromide is separated and reconducted into the chlorination vessel. If possible the methyl bromide is applied in the anhydrous state.

It could not be deduced from the known chlorination of liquid chloromethanes with exposure to light that methyl bromide, too, may very readily be chlorinated with the aid of light as a catalyst. Experiments have shown that, for instance liquid methyl chloride or methylene chloride when exposed to light in the presence of bromine cannot be transformed into bromochloromethanes. On the other hand, it is known that bromine and, to a far larger extent, iodine, even when used in small quantities, impede or practically prevent the chlorination by light of liquid methyl chloride, methylene chloride and chloroform. Consequently, it was to be expected that methyl bromide at low temperatures, i. e. in the liquid state, when exposed to light, would also not react with chlorine.

The following examples serve to illustrate the invention, but they are not intended to limit it thereto:

(1) Liquid methyl bromide is poured into a glass flask surmounted by a low-cooling device and gaseous chlorine is introduced at a temperature of about 0° C., while being exposed from outside to the light of a 300 watt lamp. The methyl bromide first dissolves a certain quantity of chlorine and after a short time a vigorous reaction occurs whereby the liquid decolorizes completely with simultaneous vivid evolution of hydrogen chloride. Correspondingly with the absorption of chlorine the temperature of the liquid increases and the introduction of chlorine is interrupted when the temperature has increased to about 20° C. The dissolved hydrogen chloride is extracted by a short boiling in a reflux apparatus and the unchanged methyl bromide is separated by fractional distillation from the chloro-bromomethane which latter contains only a small amount of dichloro-bromomethane.

On continuing the chlorination until the temperature has increased to about 35° C. to about 45° C. a mixture of nearly equal parts by weight of monochloro-bromomethane and dichloro-bromomethane as well as of a small proportion of trichloro-bromomethane is obtained.

(2) For the continuous manufacture of chloro-bromomethane by chlorinating methyl bromide the following method may be applied:

Liquid methyl bromide is poured into a cylindrical glass vessel provided with a low-cooling reflux apparatus and exposed to an exterior light source and gaseous chlorine is introduced from below into the liquid at a temperature of about 0° C. When the chlorination of the methyl bromide has set in the temperature in the chlorination vessel is allowed to rise to about +12° C. Thereafter a small excess of methyl bromide is introduced into the chlorination vessel besides the chlorine. Through the low-cooling device hydrogen chloride escapes which, according to the temperature of the low-cooling device, contains a certain quantity of methyl bromide. This waste gas is freed from hydrogen chloride in known manner, for instance by washing out with water, and the methyl bromide escaping from the washing apparatus is dried, liquefied by subsequent low-cooling and reconducted into the reaction vessel. The chlorination mixture contained in the reaction vessel, which consists of an excess of methyl bromide, monochloro-bromomethane formed and a small quantity of higher chlorinated bromomethanes flows into a distillation device where the methyl bromide is extracted by boiling whereas the chloro-bromomethane remains in the distilling vessel. The methyl bromide distilled is likewise liquefied by low-cooling and reconducted into the chlorination vessel. In this manner it is possible to permanently work with a certain excess of methyl bromide in the chlorination vessel and to produce, depending upon the quantity of the excess of methyl bromide, varying quantities of monochloro-bromomethane besides more or less highly chlorinated chloro-bromomethanes.

We claim:

1. The process which comprises causing chlorine to act upon liquid methyl bromide with exposure to actinic light.

2. The process which comprises causing chlorine to act upon liquid methyl bromide with exposure to actinic light and under atmospheric pressure.

3. The process which comprises causing chlorine to act upon liquid methyl bromide with exposure to actinic light under atmospheric pressure and at temperatures between about 0° C. and about 20° C. until about ½ mol of chlorine has been absorbed per 1 mol of methylbromide

KARL DACHLAUER.
HERMANN PETRI.